(12) United States Patent
Schwuchow et al.

(10) Patent No.: US 6,217,064 B1
(45) Date of Patent: Apr. 17, 2001

(54) GAS GENERATOR

(75) Inventors: Karsten Schwuchow, Wasserburg;
Wolf-Dieter Woitge, Waldkraiburg;
Michael Tasche, Rostock; Johann Seidl, Töging, all of (DE)

(73) Assignee: TRW Airbag Systems GmbH & Co. KG, Aschau am Inn (DE)

( * ) Notice: Subject to any disclaimer, the term of this patent is extended or adjusted under 35 U.S.C. 154(b) by 0 days.

(21) Appl. No.: 09/125,103

(22) PCT Filed: Dec. 5, 1997

(86) PCT No.: PCT/EP97/06817
§ 371 Date: Nov. 20, 1998
§ 102(e) Date: Nov. 20, 1998

(87) PCT Pub. No.: WO98/24662
PCT Pub. Date: Jun. 11, 1998

(30) Foreign Application Priority Data
Dec. 6, 1996 (DE) ............................................... 196 50 630

(51) Int. Cl.[7] .................................................. B60R 21/26
(52) U.S. Cl. ............................................................. 280/737
(58) Field of Search ..................................... 280/737, 741; 137/68.25, 68.28

(56) References Cited

U.S. PATENT DOCUMENTS

| | | |
|---|---|---|
| 3,709,239 * | 1/1973 | Morck, Jr. ........................ 137/68.25 |
| 3,721,456 | 3/1973 | McDonald . |
| 4,505,289 * | 3/1985 | Wilson ............................... 137/68.25 |
| 4,913,184 * | 4/1990 | Fallon ................................ 137/68.28 |
| 5,462,307 | 10/1995 | Webber et al. . |
| 5,582,426 | 12/1996 | O'Loughlin et al. . |
| 5,615,912 * | 4/1997 | O'Laughlin et al. ................ 280/737 |
| 5,690,357 * | 11/1997 | Cuevas ................................ 280/737 |

FOREIGN PATENT DOCUMENTS

| | | |
|---|---|---|
| 19644258 * | 4/1997 | (DE) . |
| 0733519 * | 9/1996 | (EP) . |

* cited by examiner

Primary Examiner—Brian L. Johnson
Assistant Examiner—Bryan Fischmann
(74) Attorney, Agent, or Firm—Tarolli, Sundheim, Covell, Tummino & Szabo L.L.P.

(57) ABSTRACT

A gas generator with a housing (14), and outflow opening (16) in the housing (14), via which gas can emerge, and with a bursting membrane (17) which closes the outflow opening in the non-activated state of the gas generator and which is destroyed on activation, the bursting member (17) having an outer edge at which it is permanently fastened to a wall (24) which defines at least one axial section of the outflow opening (16), is characterized in that the wall (24) is rounded or extends inwards and obliquely in the outflow direction downstream immediately after the fastening region (31) of the bursting membrane (17).

17 Claims, 3 Drawing Sheets

GAS GENERATOR

BACKGROUND OF THE INVENTION

The invention relates to a gas generator with a housing, an outflow opening in the housing via which gas can emerge, and a bursting membrane which closes the outflow opening in the non-activated state of the gas generator and which is destroyed on activation, the bursting membrane having an outer edge at which it is permanently fastened to a wall which defines at least one axial section of the outflow opening.

Such a gas generator is known from the U.S. Pat. No. 3,721,456 to McDonald. This generic tubular gas generator has a housing constructed in several parts. The housing consists of a tubular section and of an expensively manufactured end wall screwed therein, which has a narrowing outflow opening. On the inner face, a membrane is fastened to the end wall upstream of the outflow opening. The inner face of the end wall continues into the outflow opening in a 90° angle. The membrane is fastened to the inner face of the end wall. When a predefined internal pressure is exceeded in the housing, the bursting membrane tears into individual pieces. Some membrane segments which are formed thereby are entrained with the gas stream and can arrive into the adjoining gas bag, where they can destroy the gas bag wall because of their high temperature. In order to prevent an entrainment of such hot membrane segments into the gas bag, in the prior art filters are always provided after the outflow opening, which hold back the membrane segments.

SUMMARY OF THE INVENTION

The invention provides a more simply constructed gas generator, in which the danger of the formation of membrane segments entrained with the gas stream can be ruled out.

This is achieved in a gas generator of the type initially mentioned in that the wall is rounded or extends inwards and obliquely in the outflow direction downstream immediately after the fastening region. Surprisingly, it has been found that through this step, no membrane segments are produced which are entrained with the gas stream. Rather, even after the destruction of the membrane, the membrane segments are held in the fastening region against the wall. In the prior art, it is obviously principally the notch effect, i.e. a too sharp-edged transition between the inner face of the end wall and the inner face of the outflow opening, which transition leads to the shearing off or to too intensive a bending of the membrane on its destruction. Through this simple step according to the invention, the filters, hitherto always necessary, become superfluous.

According to a further embodiment, the inner face of the wall is shaped in such a manner that the bursting membrane does not come to lie against the wall shortly before reaching the internal pressure in the housing leading to its destruction. Through this feature, the membrane is prevented from tearing in an undefined manner. With the presence of a gas pressure in the housing, the membrane is curved outwards in a calotte shape. The greatest tension in the membrane will occur here at the region which is shaped furthest outwards (crown region). Starting from this region, the destruction of the bursting membrane begins after the bursting pressure has been reached. Hence, a star-shaped tear pattern is produced with relatively short membrane segments of equal length. If the membrane were to be able to come to lie against the inner face of the wall, the tear of the membrane would start from a different point and membrane segments of differing length would result. The destruction of the membrane would thereby be able to be predetermined less exactly than is the case through the provision of the above-mentioned step. In addition, with the membrane lying against the wall, the bursting pressure would increase, which would result in a greater stressing of the housing.

Preferably, the inner face of the wall is shaped in such a manner that the membrane segments come to lie against the wall after destruction. Thereby, a tearing off of segment pieces by the gas stream is to be prevented. The membrane segments come to lie against the inner face of the wall and the force applied onto them by the impinging flow is introduced directly into the wall.

Preferably, the wall is part of a nozzle or throttle immediately adjoining the bursting membrane in the direction of flow. If a throttle is provided, the flow channel which is defined by the outflow opening has a concave section. It has been found that the membrane segments can very well come to lie against a concave section without pieces being torn off from them.

The concave section is, in addition, preferably dome-shaped.

If a bevelled, i.e. conical section follows immediately after the fastening section, then this conical section is inclined at an angle of 30° to 45° with respect to a plane which is defined by the membrane when not acted upon by pressure.

The bevelled section continues from a rounded section into the concave section, so that marked shoulders or bends on the inner face are prevented. Bends or shoulders do not, however, automatically have to lead to the tearing off of the membrane segments and can certainly be provided.

However, continuous transitions between differently shaped sections are preferably to be provided.

A further step, in order to prevent the tearing off of membrane segments or of part of membrane segments consists in that owing to the length of the outflow channel, a protruding of membrane segments out from the channel is ruled out. The protruding section would in fact be greatly stressed by the compressed gas. This would lead to the tearing off of the section of the membrane segments.

If the outflow channel is provided with a cylindrical section which defines the smallest flow cross-section, then it has proved to be advantageous if the membrane segments can not even project into the section with the smallest flow cross-section.

BRIEF DESCRIPTION OF THE FIGURES

Further features and advantages of the invention will be apparent from the following description and from the following drawings, to which reference is made. In the drawings.

DETAILED DESCRIPTION

Figure 1:
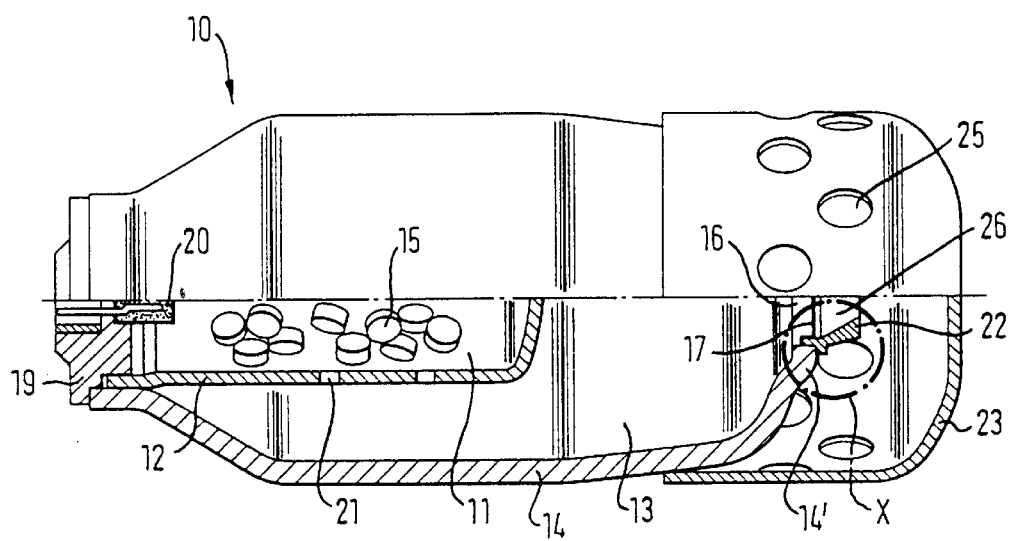
FIG. 1 shows a side view, partially in longitudinal section, of an embodiment of the gas generator according to the invention.

In FIG. 1 a gas generator 10 is shown. This consists substantially of a combustion chamber 11 in a cylindrical combustion chamber housing 12, which is surrounded by a pressure chamber 13 with a housing 14. In the combustion chamber 11, a propellant 15, present in tablet form, is housed, whereas a gas under pressure is situated in the pressure chamber 13. The housing 14 has a tubular section and also an end wall 14' adjoining thereto. The end wall 14' has an outflow opening 16, via which, in the activated state, gas flows into a gas generator. A plug-like closure body is inserted into the outflow opening 16, which closure body closes the outflow opening 16 and comprises a hollow part, designated as membrane holder 22, and also a bursting membrane 17, which is permanently fastened to the membrane holder 22 in the region of its end close to the interior of the gas generator. The membrane holder 22 and the membrane form one unit. Immediately downstream of the bursting membrane 17, the membrane holder 22 narrows and forms in this region a nozzle which, on activation of the gas generator, codetermines the outflow behaviour of the gas and the pressure distribution in the gas bag.

A further opening in the housing 14, facing away from the gas bag, is closed in a gas-tight manner by a closure piece 19 into which an ignition unit 20 is integrated.

When the ignition unit 20 is electrically activated, this ignites the propellant 15. The hot propellant gas produced through the deflagration of the propellant 15 flows into the combustion chamber 11, and through openings 21 provided in the combustion chamber housing 12 into the pressure chamber 13. Thereby, the compressed gas is heated and the pressure prevailing in the compressed gas container 13 is distinctly increased compared with the pressure in the non-activated state. The bursting membrane 17, as the weakest component, is therefore so greatly stressed that it is further plastically deformed and finally bursts.

After the bursting, the compressed gas flows via the outflow opening 16 into a placed-on diffusor tube 23, where it expands and arrives into the gas bag via outflow openings 25.

The outflow opening 16, as the membrane holder 22 is inserted into it, is only partially defined by the opening in the end wall of the housing 14. The greatest section of the outflow opening, which defines an outflow channel 26, is formed by the membrane holder 22, through which the gas flows.

Figure 2:
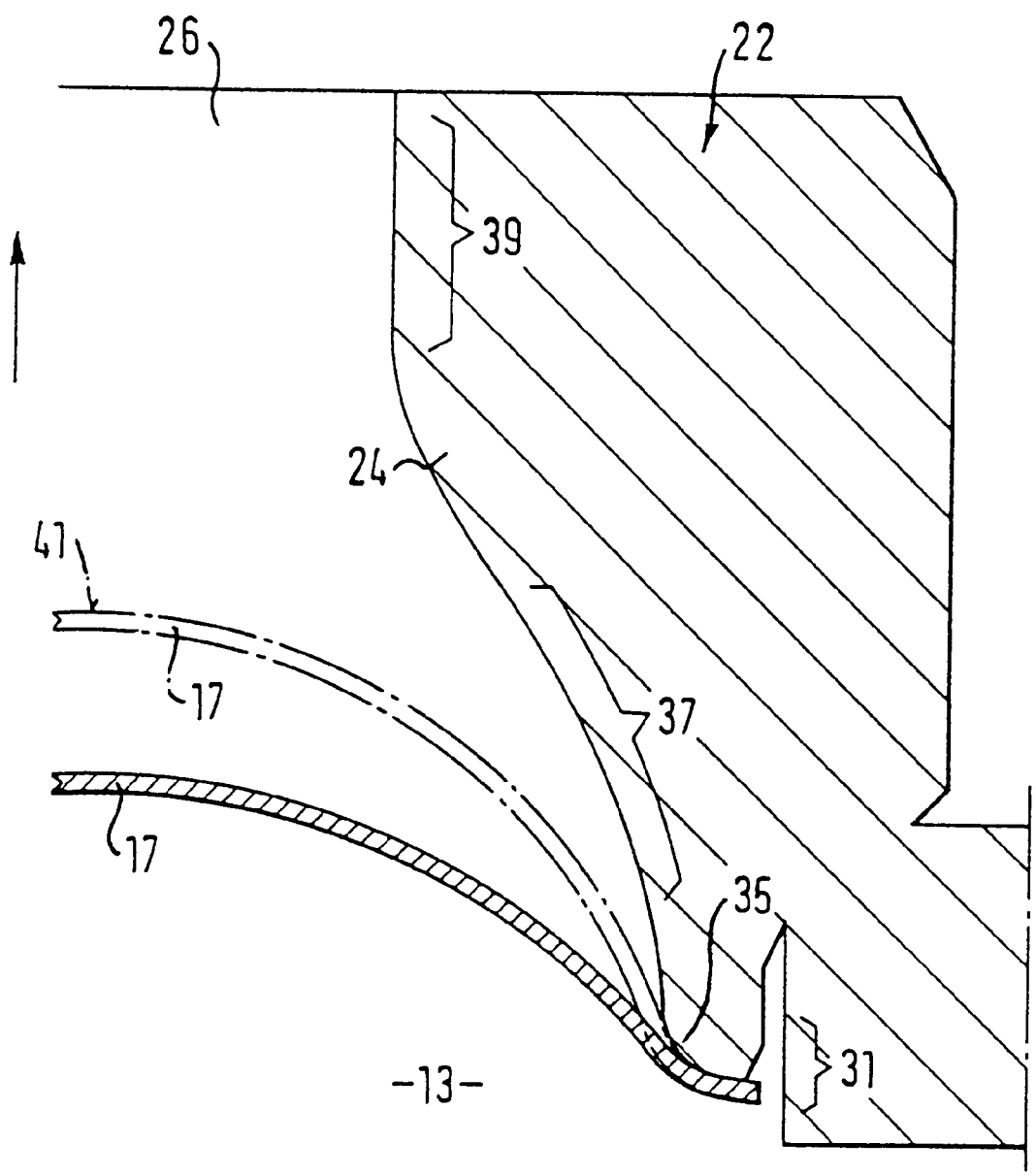
FIG. 2 shows an enlarged longitudinal sectional view of the region marked by X in FIG. 1, which shows a half of the membrane holder inserted into the outflow opening.

In FIG. 2 the membrane holder 22 is illustrated with the bursting membrane 17 welded thereon. The bursting membrane 17 is illustrated in two states. In a non-activated, first state of the gas generator, it is already extended outwards in a calotte shape. In the second state, it is extended still further outwards. This state is reached shortly after activation of the gas generator. The bursting membrane here is shortly to burst.

Figure 4:
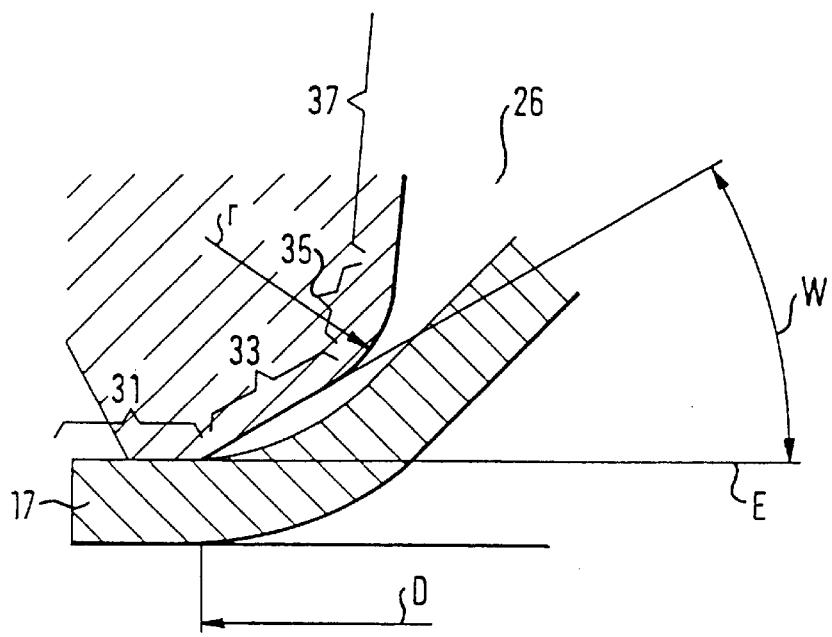
FIG. 4 shows an enlarged longitudinal sectional view of the membrane holder according to FIG. 3 and the membrane fastened thereto in the fastening region of the membrane.

The membrane holder 22 has various sections. In a fastening region 31, at the base of the membrane holder 22, the bursting membrane 17 is welded to the membrane holder 22. The fastening region is illustrated again more exactly in FIG. 4 with a slightly different membrane holder 22. On the inner face of the wall 24 of the membrane holder 22, adjoining the fastening region 31 is a section extending inwards and obliquely in the direction of flow about the angle W, which section is designated hereinbelow as inclined section 33. Adjoining the inclined section 33 is a curvature with radius r on the inner face of the wall 24. This section 35 is designated as rounded section 35. Adjoining the rounded section 35, in turn, is a concave, dome-shaped section 37, which continues with a curvature into a cylindrical section 39, which forms the region of the narrowest cross-section of the outflow opening 16. The individual section pass into each other continuously, without shoulders or edges being present, which could lead to the tearing off of the membrane segments (not shown) arising on bursting of the membrane 17.

Instead of the inclined section 33, a curvature could also be provided in this region. It is important in the design of the inner face of the wall 24 that the bursting membrane 17, in its state shortly before bursting, does not lie against the inner face. Thereby, it is ensured that it is most greatly stressed in its crown region 41 which is shaped furthest outwards, and that the tearing of the bursting membrane starts from the crown region 41. The resulting membrane segments have approximately the same length. The length of the outflow channel in the region of the sections 33, 35, 37 is so long that the segments which come to lie against the wall 24 after the opening process, do not protrude into the region 39 of the narrowest cross-section. Thereby, the points of the segments are prevented from being entrained by the outflowing gas into the gas bag and from destroying the gas bag wall.

The membrane holder 22 has several advantages. Firstly, it is constructed as a plug-like closure body which is inserted into the outflow opening and, after the opening process, partially also defines the outflow opening and its flow cross-section. Hence, the outflow characteristic of the gas generator can be adapted to the requirements quickly and at a favourable cost by changing the flow cross-sections, in particular the nozzle shape, without a re-fabrication of the housing 14 being necessary. Secondly, the membrane holder 22 is constructed in the fastening region 31 in such a manner that no notch effect is exerted on the deforming bursting membrane 22, when it bursts. Rather, as already explained, the bursting membrane 17 comes to lie against the inner face of the wall. The inclined section 33 is inclined at an angle W between 30° and 45° with respect to a plane E, which is defined by the upper face of the bursting membrane 17 in the state of the membrane when not acted upon by pressure.

The bursting membrane can in fact have areas of weakness which form nominal fracture points. Owing to the design of the inner wall, however, this is not necessary. Even with a bursting membrane 17 not provided with areas of weakness, a predeterminably, controlled tearing behaviour is produced and no parts of the bursting membrane 17 are entrained into the gas bag. Hence, the gas generator is constructed without a filter after the outflow opening 16, which reduces the costs and also the weight of the gas generator.

Figure 3:
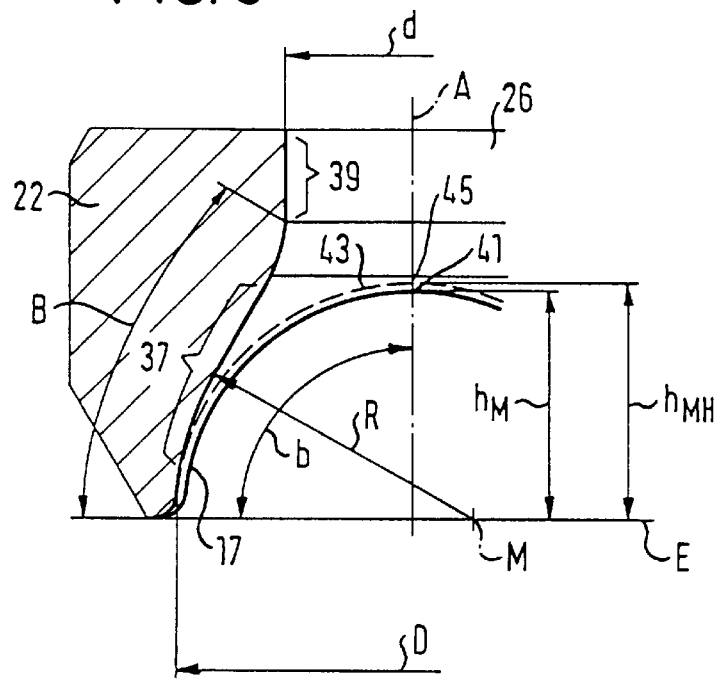
FIG. 3 shows an enlarged longitudinal sectional view of the left half of a slightly different membrane holder.

With the aid of FIG. 3, an embodiment of the membrane holder 22, which has proved to be very advantageous, is explained in further detail. The inner face of the wall 24 of the membrane holder 22 has the regions and sections previously already described, namely the fastening region 31, the inclined section 33, the rounded section 35, the dome-shaped section 37 and the cylindrical section 39. In FIG. 3 in particular the dome-shaped section 37 is illustrated, provided with dimensioning arrows. The dome-shaped section 37 is defined inter alia by a radius R, the centre point M of which lies in the plane E. The centre point, however, does not lie on the centre axis A of the outflow opening, but rather offset to it, in the direction away from the left-hand part of the wall 24 which is shown. If one places in imagination a sphere 43 into the dome-shaped section 37, which sphere 43 is shown with broken lines, and if one selects this sphere 43 to be as large as possible, then an upper crown point 45 is produced, the distance of which from the plane E is indicated by $h_{MH}$. This height $h_{MH}$ must in every case be greater than the height $h_M$, which defines the distance of the crown 41 of the membrane 17, extended to the maximum, from the plane E. Hence, it is ruled out that the bursting membrane can come to lie against the inner face of the wall 24. In addition, D indicates the so-called effective diameter of the bursting membrane 17, this diameter delimiting the region in which the bursting membrane curves outwards, The height $h_{MH}$ corresponds approximately to half the effective diameter D of the bursting membrane 17. The length of the membrane segments, measured from the fastening region 31, corresponds substantially to the arc length b. The arc length b is smaller than the length of the outflow channel 26 from the fastening region 31 up to the start of the cylindrical section 39. This length is measured on the inner face of the wall 24 and in the direction of flow and is designated by B. Through this geometric construction, the membrane segments are prevented from protruding into the region of the cylindrical section 39, because otherwise a high probability exists that parts of the membrane segments are torn off by the flow.

Alternatively, the bursting membrane 17, in the state not under compressive load, can also be constructed so as to be conical in the fastening region 31, the wall 24 then also having to be constructed accordingly. The shape of the wall 24 must be designed in such a manner that through this construction the bursting membrane 17 does not come to lie against the inner face of the wall 24 in the region of the nozzle.

What is claimed is:

1. A gas generator comprising:
    a housing (14);
    an outflow opening (16) in the housing (14) via which gas can emerge; and
    a bursting membrane (17) which closes the outflow opening (16) in the non-activated state of the gas generator and which is destroyed on activation, the bursting membrane (17) having an outer edge at which it is permanently fastened to a wall (24) which defines at least one axial section of the outflow opening (16),
    the wall (24) being rounded or extending inwards and obliquely in the outflow direction downstream immediately after the fastening region (31) of the bursting membrane,
    the outflow opening (16) being defined by an outflow channel (26) and the wall (24) being part of a nozzle which has a concave section and which adjoins the bursting membrane (17) in the outflow direction.

2. The gas generator according to claim 1 wherein the inner face of the wall (24) is shaped in such a manner that the bursting membrane (17), shortly before reaching the internal pressure in the housing (14) leading to its destruction, does not come to lie against the wall (24).

3. The gas generator according to claim 1, wherein the inner face of the wall (24) immediately after the fastening region (31) extends inwards at an angle of 30° to 45° with respect to a plane (E) defined by the fastening region of the bursting membrane (17) and obliquely in the outflow direction.

4. The gas generator according to claim 1, wherein the destruction of the bursting membrane (17), membrane segments are produced which come to lie against an inner face of the wall (24), the shape of the inner face being coordinated with the strength of the bursting membrane (17) in such a manner that the membrane segments are not torn away with the gas streaming in the outflow direction.

5. The gas generator according to claim 4, wherein the outflow channel (26) is formed by the wall (24), the length of which, measured on the inner face of the wall (24) in the outflow direction, is longer than that of the membrane segments coming to lie against the wall (24).

6. The gas generator according to claim 4, wherein an outflow channel (26) is formed by the wall (24), which has a concave section (37) adjacent to the fastening region (31) of the bursting membrane (17) and a substantially cylindrical section (39) adjoining thereto; and the membrane segments, owing to the length of the outflow channel (26) up to the cylindrical section (39), do not protrude into the cylindrical section (39).

7. The gas generator according to claim 1 wherein the bursting membrane (17) is fastened to a membrane holder (22) having the wall (24), which membrane holder (22) is inserted as a plug-shaped closure body into the outflow opening (16) and closes the outflow opening (16) and, on destruction of the bursting membrane (17), co-defines the outflow opening (16).

8. The gas generator according to claim 1 wherein the bursting membrane (17) has areas of weakness which form nominal fracture points.

9. The gas generator according to claim 1 wherein the gas generator contains stored compressed gas.

10. The gas generator according to claim 1 wherein an inner face of the wall (24) is formed without a shoulder and wherein differently shaped sections (33, 35, 37, 39) are provided, which pass into each other continuously.

11. A gas generator comprising:
    a housing (14);
    an outflow opening (16) in the housing (14) via which gas can emerge; and
    a bursting membrane (17) which closes the outflow opening (16) in the non-activated state of the gas generator and which is destroyed on activation,
    the bursting membrane (17) having an outer edge at which it is permanently fastened to a wall (24) which defines at least one axial section of the outflow opening (16),
    a section (33) on the inner face of the wall (24) being rounded or extending inwards and obliquely in the outflow direction downstream immediately after the fastening region (31) of the bursting membrane,
    the section (33) of the wall (24) adjoining the fastening region (31) and continuing via a rounded section (35) into a concave section (37).

12. The gas generator according to claim 11 wherein a substantially cylindrical section (39) adjoins the concave section (37).

13. The gas generator according to claim 11 wherein the concave section (37) is dome-shaped.

14. The gas generator according to claim 11 wherein the concave portion (37) is dome-shaped, the center point of a radius (R) co-defining the dome-shaped portion (37) lying on a plane (E) defined by the fastening region (31) of the bursting membrane (17).

15. A gas generator comprising:
    a housing (14);
    an outflow opening (16) in the housing (14) via which gas can emerge; and
    a bursting membrane (17) which closes the outflow opening (16) in the non-activated state of the gas generator and which is destroyed on activation,
    the bursting membrane (17) having an outer edge at which it is permanently fastened to a wall (24) which defines at least one axial section of the outflow opening (16),
    the wall (24) being rounded or extending inwards and obliquely in the outflow direction downstream immediately after the fastening region (31) of the bursting membrane, on destruction of the bursting membrane (17), membrane segments being produced which come to lie against an inner face of the wall (24), the shape of the inner face being coordinated with the strength of the bursting membrane (17) in such a manner that the membrane segments are not torn away with the gas stream, an outflow channel (26) being formed by the wall (24), which as a concave section (37) adjacent to the fastening region (31) of the bursting membrane (17) and a substantially cylindrical section (39) adjoining thereto, the membrane segments, owing to the length of the outflow channel (26) up to the cylindrical section (39), not protruding into the cylindrical section (39).

16. A gas generator comprising:

a housing (14);

an outflow opening (16) in the housing (14) via which gas can emerge; and a bursting membrane (17) which closes the outflow opening (16) in the non-activated state of the gas generator and which is destroyed on activation, the bursting membrane (17) having an outer edge at which it is permanently fastened to a wall (24) which defines at least one axial section of the outflow opening (16), the wall (24) being rounded or extending inwards and obliquely in the outflow direction downstream immediately after the fastening region (31) of the bursting membrane, the bursting membrane (17) being fastened to a membrane holder (22) having the wall (24), the membrane holder (22) being inserted as a plug-shaped closure body into the outflow opening (16) and closing the outflow opening (16), and, on destruction of the bursting membrane (17), co-defines the outflow opening (16).

17. The gas generator according to claim 16 wherein the membrane holder (22) forms a nozzle or throttle immediately downstream of the bursting membrane (17).

* * * * *